United States Patent Office 3,557,012
Patented Jan. 19, 1971

---

3,557,012
HEAT-STABILIZED INFRARED ABSORBERS AND COMPOSITIONS CONTAINING THE SAME
Robert Jerome Tucker, Hackettstown, N.J., assignor to American Cyanamid Company, Stamford, Conn., a corporation of Maine
No Drawing. Filed Mar. 18, 1969, Ser. No. 808,305
Int. Cl. G02b 5/22
U.S. Cl. 252—300
8 Claims

ABSTRACT OF THE DISCLOSURE

A defined class of N,N,N',N'-tetraphenyl-substituted p-benzoquinone diimonium salt infrared absorbers are stabilized against the deleterious effects of heat encountered in the processing of plastics in which the absorbers are incorporated, such as injection moulding, by the addition to the plastic melt of a compound selected from (a) a p-benzoquinone of the formula:

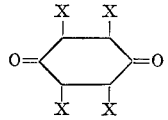

where each X individually represents hydrogen, chlorine, or fluorine and (b) hydroquinone and its lower alkyl ethers.

---

This invention relates to the stabilization of certain infrared absorbing compounds. More particularly, it relates to the stabilization of N,N,N',N'-tetraphenyl-substituted p-benzoquinone diimonium salt infrared absorbers of the general formula:

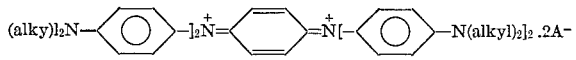

where alkyl represents a lower ($C_1$ to $C_6$) alkyl group and A represents an anion. The anion of the salt is not critical and may be any of a variety of anions, such as chloride ($Cl^-$), chlorate ($ClO_4^-$), nitrate ($NO_3^-$), sulfate ($SO_4^-$), benzenesulfonate ($C_6H_6SO_3^-$), fluoborate ($BF_4^-$), hexafluoroarsenate ($ASF_6$), and hexafluoroantimonate.

The infrared absorber salts, per se, are disclosed and claimed in a copending application, Serial No. 692,312, filed Dec. 21, 1967, the disclosure of which is hereby incorpated in the present application by reference.

As is well known, infrared absorbers have found wide use in various substrates to decrease transmission of radiant energy in the infrared region of the spectrum. Examples of such use include optical filters, sunglasses, welders' goggles, windows, and various protective films and wrappers. It is important in many instances that optical filters exhibit a neutral shade of gray. The N,N,N', N'-tetraphenyl-substituted p-benzoquinone diimonium salts of the above general formula are the only infrared absorbing compounds known at present which will transmit energy of the wavelengths necessary to give a neutral gray when incorporated in a plastic substrate in combination with suitable dyes. However, these salts tend to deteriorate at the heating temperatures encountered in many of the common techniques, such as injection molding, used for processing plastic materials. The salts, when thus deteriorated, change from their normal light green color to a yellow-green which prevents the obtainment of the desired neutral gray color in the substrate.

Because of the excellent infrared-absorbing properties of the diimonium salts, some means of stabilizing them during the aforesaid processing procedures would be an important contribution to the art. It is the object of this invention to provide such a means.

It has now been found that N,N,N',N'-tetraphenyl-substituted p-benzoquinone diimonium salts can be stabilized against the deleterious effects of heat normally encountered during their incorporation into plastics by addition thereto of a minor amount of one of the following compounds: (a) a p-benzoquinone compound of the general formula:

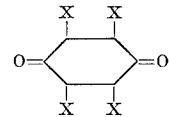

where each X, individually, represents hydrogen, chlorine or fluorine and (b) hydroquinone and its lower alkyl ethers.

The stabilization of the diimonium salts may be effected by mixing the stabilizing compound with a polymer or precursor thereof, including any necessary catalysts, and the diimonium salt, and then processing the mixture into useful articles, such as lenses, filters, etc. or the stabilizer and infrared absorber may be mixed together and added, as such, to the plastic melt formulation.

p-Benzoquinones which may be used to stabilize the diimonium salt infrared absorbers include p-benzoquinone itself, chloranil, fluoranil, di- and trichloro substituted p-benzoquinones, and mixed chloro-fluoro-p-benzoquinones. Chloranil is a particularly useful stabilizer in the process of this invention.

The hydroquinones which may be used as stabilizers in the process of this invention include hydroquinone itself and its lower ($C_1$ to $C_6$) alkyl ethers, such as p-methoxy-, p-ethoxy-, p-butoxy- and p-hexoxyphenol.

The N,N,N',N'-tetraphenyl-substituted p-benzoquinone diimonium salts can be used along with the stabilizers in plastic substrates generally, e.g., polymethacrylates, cellulose esters, vinyl polymers, polystyrene, etc. At least about 0.01% by weight of the absorber is employed for this use, the usual amount being from about 0.01% to about 1%. However, higher amounts, up to 5% or more, may be used.

The amount of stabilizer used must be at least equal to the amount by weight of the infrared absorber; an excess of from about 5 to about 20, or more, times the weight of the absorber being generally preferred.

A full understanding of the invention may be had from the following illustrative examples.

EXAMPLE 1

(A) An injection molding mix was prepared from 100 grams cellulose propionate (C.P. 520, Celanese), 0.05 gram N,N,N',N'-tetrakis(p-dibutylaminophenyl)-p-benzoquinone-bis(imonium hexafluoroantimonate), 0.003 gram recrystallized C.I. Solvent Violet 13, 0.004 gram C.I. Solvent Blue 58, 0.001 gram C.I. Disperse Red 9, and 0.2 gram chloranil. The mix was heated until fluid, forced into a mold and cooled. The product was a film of neutral gray shade having excellent infrared-absorbing characteristics.

(B) Example A, above, was repeated except that no chloranil was added to the molding mix. In this case, a green film was obtained, indicating that deterioration of the infrared absorber had occurred.

EXAMPLES 2–4

Additional compositions (Examples 2–4) representative of the invention were prepared as follows: To 100 g. of Du Pont 29 grade poly(methylmethacrylate) there was added 0.05 g. of N,N,N',N'-tetrakis(p-dibutylaminophenyl)-p-benzoquinone-bis(imonium hexafluoroantimonate) and a stabilizer compound in the amounts shown in Table I. The mixture in each case was charged to a Melt Index apparatus where it was held at 190° C. for one minute (in the heated barrel of the apparatus). The mix melt was then extruded from an orifice at the bottom of the apparatus by force, applied to a plunger, and the extruded melt compression molded into a film.

A "control" film prepared in the same manner as above, but without addition of any stabilizer, was also prepared.

The effectiveness of the stabilizer compounds was then ascertained from the color of the films obtained. Thus, since no dyes were added to the moulding mixes, if there was no degradation of the infrared absorber, the film was a light green (the normal color of the absorber compound). On the other hand, where significant degradation of the absorber had occurred, the film was a yellow-green. The results, set forth in Table I, demonstrate the excellent stabilizing effect provided by each of the stabilizer compounds.

TABLE I

| Example No. | Stabilizer | Amount of stabilizer added (g.) | Color of film |
| --- | --- | --- | --- |
| 2 | Chloranil | 0.2 | Light green. |
| 3 | p-Benzoquinone | 1.0 | Do. |
| 4 | p-Methoxyphenol | 0.6 | Do. |
| Control | None | | Yellow green. |

I claim:

1. A plastic composition containing at least about .01% of an infrared absorbing compound of the formula:

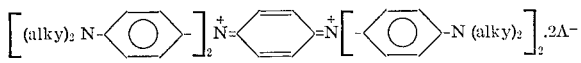

where alkyl represents a lower alkyl group and A⁻ represents an anion and an effective amount of a stabilizer compound selected from the group consisting of (a) p-benzoquinones of the formula:

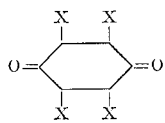

in which each X is individually selected from the group consisting of hydrogen, chlorine and fluorine; and (b) hydroquinone and its lower alkyl ethers.

2. A composition according to claim 1 wherein the stabilizer compound is chloranil.

3. A composition according to claim 1 wherein the infrared-absorbing compound is N,N,N',N'-tetrakis-(p-dibutylaminophenyl) - p - benzoquinone - bis(imonium hexafluoroantimonate).

4. A composition according to claim 1 wherein the infrared-absorbing compound is N,N,N',N'-tetrakis(p-dibutylaminophenyl) - p-benzoquinone-bis(imonium hexafluoroantimonate) and the stabilizer compound is chloranil.

5. An infrared-absorbing plastic filter containing from about 0.01 to about 1% by weight of an infrared-absorbing compound as defined in claim 1 and at least an equal amount of a stabilizer compound as defined in claim 1.

6. A plastic filter according to claim 5 wherein the stabilizer compound is chloranil.

7. A plastic filter according to claim 5 wherein the infrared-absorbing compound is N,N,N',N'-tetrakis(p-dibutylaminophenyl) - p - benzoquinone-bis(imonium hexafluoroantimonate).

8. A plastic filter according to claim 5 wherein the infrared-absorbing compound is N,N,N',N'-tetrakis(p-dibutylaminophenyl)-p-benzoquinone - bis(imonium hexafluoroantimonate) and the stabilizer compound is chloranil.

References Cited

UNITED STATES PATENTS 3,251,881  5/1966  Susi _____ 252—300

GEORGE F. LESMES, Primary Examiner

J. P. BRAMMER, Assistant Examiner

U.S. Cl. X.R.

260—396; 45.9; 350—160

UNITED STATES PATENT OFFICE
CERTIFICATE OF CORRECTION

Patent No. 3,557,012   Dated January 19, 1971

Inventor(s) Robert Jerome Tucker

It is certified that error appears in the above-identified patent and that said Letters Patent are hereby corrected as shown below:

Column 1, line 36, the left-hand portion of the formula reading "(alky)l$_2$N-" should read -- [(alkyl)$_2$N- --.
Column 1, line 43, "(ASF$_6$)" should read -- (ASF$_6^-$) --.
Column 1, lines 47-48, "incorpated" should read -- incorporated --. Column 3, Claim 1, line 28, in the for "(alky)$_2$", both occurrences, should read -- (alkyl)$_2$ --.
Column 3, Claim 1, line 30, "an effective amount of a stabilizer" should read -- at least an equal amount of a he stabilizer --.

Signed and sealed this 4th day of May 1971.

(SEAL)
Attest:

EDWARD M. FLETCHER, JR.   WILLIAM E. SCHUYLER, JR.
Attesting Officer         Commissioner of Patents.